H. G. WOEHLER.
CORN PLANTER.
APPLICATION FILED JAN. 27, 1911.
998,938.
Patented July 25, 1911.
2 SHEETS—SHEET 1.
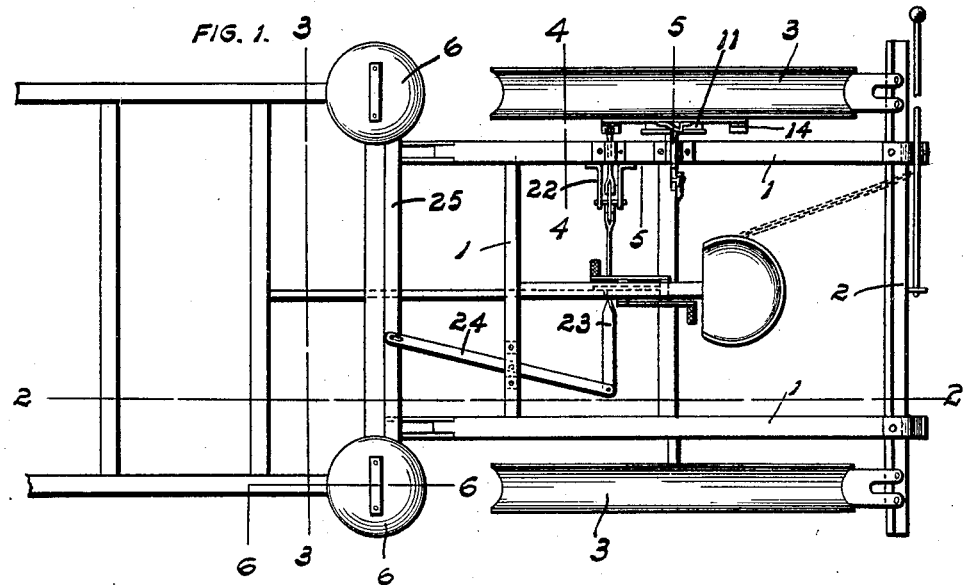
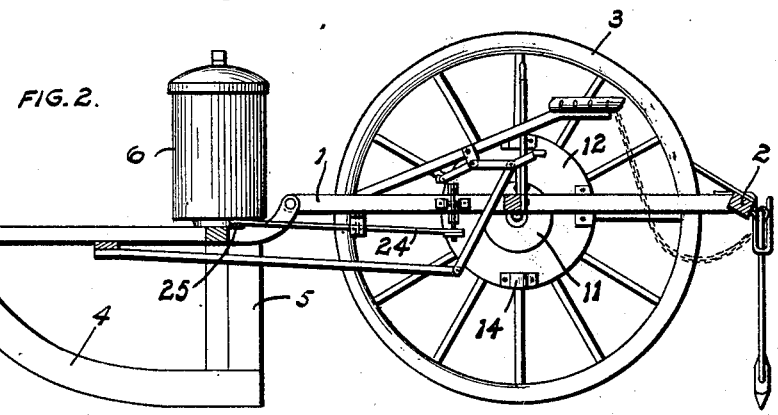
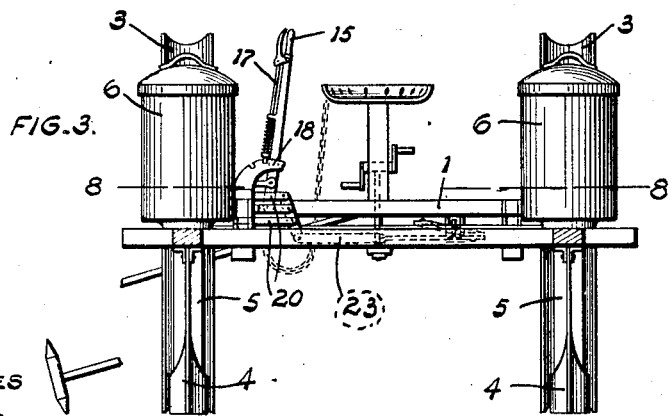
WITNESSES
INVENTOR
HENRY G. WOEHLER

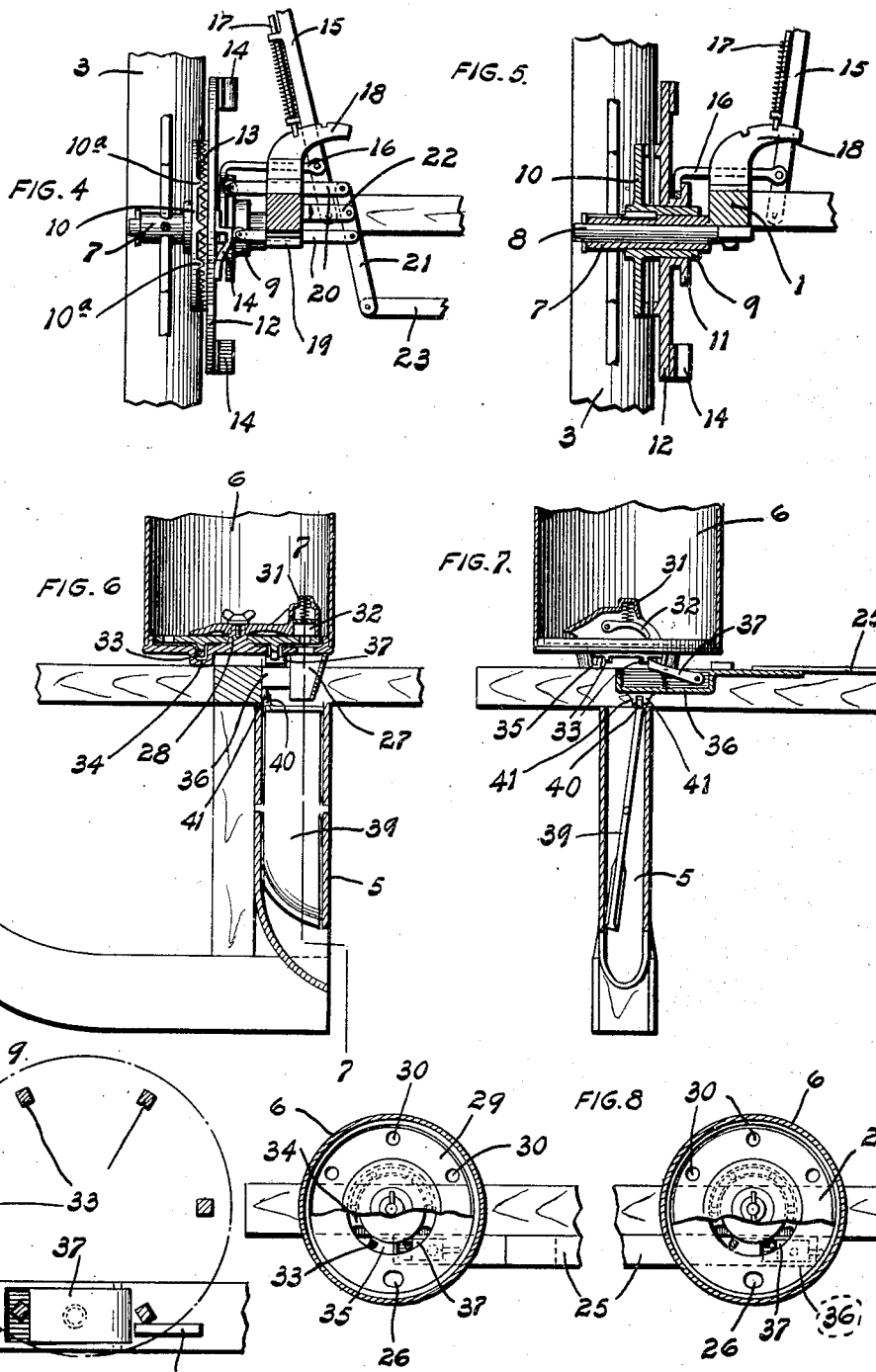

UNITED STATES PATENT OFFICE.

HENRY G. WOEHLER, OF ST. LOUIS, MISSOURI, ASSIGNOR OF THREE-FOURTHS TO CHARLES MADLINGER, OF ST. LOUIS, MISSOURI, AND ONE-FOURTH TO CHARLES DOWNEY, OF IRONTON, MISSOURI.

CORN-PLANTER.

998,938.      Specification of Letters Patent.      Patented July 25, 1911.

Application filed January 27, 1911. Serial No. 605,026.

*To all whom it may concern:*

Be it known that I, HENRY G. WOEHLER, a citizen of the United States, residing at St. Louis, Missouri, have invented a certain new and useful Improvement in Corn-Planters, of which the following is a full, clear, and exact description, such as will enable others skilled in the art to which it appertains to make and use the same, reference being had to the accompanying drawings, forming part of this specification, in which—

Figure 1 is a plan view of a corn planter of my improved construction. Fig. 2 is a section taken on the line 2—2 of Fig. 1. Fig. 3 is a cross section taken on the line 3—3 of Fig. 1. Fig. 4 is an enlarged detail section taken on the line 4—4 of Fig. 1. Fig. 5 is an enlarged cross-section taken approximately on the line 5—5 of Fig. 1. Fig. 6 is an enlarged section taken approximately on the line 6—6 of Fig. 1. Fig. 7 is a section taken on the line 7—7 of Fig. 6. Fig. 8 is an enlarged horizontal section taken approximately on the line 8—8 of Fig. 3, with parts of the rotating disks in the bottoms of the hoppers broken away, for the purpose of clear illustration. Fig. 9 is a detail view of a portion of the mechanism utilized for rotating the dropper plate or disk located in the bottom of the seed box or hopper.

This invention relates generally to corn planters, and more particularly to the seed dropping mechanism located in the bottoms of the seed boxes or hoppers, to the devices which actuate the seed dropping mechanism, and to the means whereby the rotary motion of one of the wheels of the planter is converted into reciprocatory motion, and imparted to the dropping mechanism.

The principal object of my invention is to provide a simple inexpensive construction which can be readily applied to the type of corn planters now in general use whereby the rotary motion of one of the wheels of the planter is converted into reciprocatory motion, and thus imparted to the dropper plates arranged for rotation in the bottoms of the seed boxes, and which motion transmitting and converting mechanism can readily be thrown into and out of operation at the will of the driver or operator of the planter.

A further object of my invention is to provide simple means for preventing over rotation of the dropper plates when the same are intermittently rotated to deliver the grains of corn into the chutes at the rear ends of the runners or furrow openers of the planter.

To the above purposes my invention consists in certain novel features of construction and arrangement of parts hereinafter more fully described and claimed.

Referring by numerals to the accompanying drawings 1 designates the main or wheel frame of the planer, 2 the rear rail thereof, 3 the wheels, preferably provided with grooved peripheries, 4 the runners, 5 the vertically disposed chutes at the rear ends of the runners, and 6 the hoppers or seed boxes located above the chutes 5. All of the parts just mentioned are of ordinary well known construction and, therefore, do not require a detail description.

The hub 7 of each wheel is journaled upon a stub axle 8 extending laterally from the side rails of the frame 1, and rigidly fixed in any suitable manner upon each hub is a sleeve 9 carrying a disk 10, and formed on the inner face of said disk adjacent its edge is a series of teeth 10ª.

Loosely mounted on each sleeve 9 is a grooved hub 11 and formed on or fixed thereto is a disk 12 on the outer face of which is formed a series of teeth 13 with which the teeth 10ª are adapted to interlock when said disk is moved outward to its limit of movement.

Formed on or fixed to the inner face of each disk 12 is a series of cam lugs 14, the same being arranged at equal distances apart. The grooved hub 11 and disk 12 are moved lengthwise upon the hub 9 by means of a hand lever 15 pivotally mounted at its lower end to the frame 1, and which hand lever carries a horizontally disposed rod 16, the end of which is forked so as to engage in the groove of the hub 11. The hand lever 15 is provided with a latch rod 17, the lower end of which is adapted to engage in the notches of a segment 18, which latter is fixed to the frame 1. Arranged to slide freely through bearings 19 located on top and the bottom of one of the side rails of the frame 1 are rods 20 the outer ends of which carry anti-friction rollers adapted to be successively engaged by the cam lugs 14.

21 designates a vertically disposed lever fulcrumed on a bracket 22 between the bearings 19 and the inner ends of the rods 20 are pivotally connected to said lever 21. Pivotally connected to the lower end of the lever 21 is one end of a link 23 the opposite end of which is pivotally connected to the rear end of a lever 24 fulcrumed adjacent its center to one of the cross bars of the frame 1, and the forward end of said lever 24 is pivotally connected to a transversely disposed bar 25, which latter is arranged to slide across the front of the frame 1, and with its ends operating beneath the seed boxes or hoppers 6.

Formed through the bottom of each seed box is an aperture 26 through which the grains of corn discharge into a short chute 27 which leads from the under side of the seed box into the upper end of the corresponding chute 5.

28 designates a stud projecting upward from the center of the bottom of the seed box and arranged for rotation thereon is a disk or dropper plate 29 provided with a series of openings 30 adapted to register with the aperture 26.

Supported in any suitable manner by the stud 28 is a housing 31 in which is positioned a spring held cut off finger 32, the point of which rides directly on top of the plate 29 over the openings therein, and the purpose of said finger is to prevent clogging of the grains of corn in the openings 30.

Formed on the under side of each plate 29 is a series of depending lugs 33, which occupy a groove 34 formed in the bottom of the hopper 6. There are the same number of these lugs 33 as there are openings 30 in the plate 29, and a portion of the bottom plate of the hopper 6 in front of the opening 26 is cut away as designated by 35, in order that the lugs 33 may be engaged by actuating means carried by the bar 25.

Carried by each end of the bar 25 are cups 36 in which are pivotally mounted spring pressed pawls 37, the points of which travel through the cut away portions 35 of the bottom plates of the boxes 6, and said points being adapted to successively engage the lugs 33. Positioned on top of the bar 25 immediately to the rear of the pawls 37 are lugs 38, which are for the purpose of engaging in front of one of the lugs 33 to prevent over rotation of the disks 29 when the same are partially rotated.

Arranged in each chute 5 is a vertically disposed valve plate 39, which is pivotally mounted at a point adjacent its center to the front and rear walls of the chute 5 and the upper end of each valve plate is provided with a lug 40, which engages between a pair of lugs 41 formed on the under side of the corresponding cups 36. These valve plates vibrate within the chutes 5 and the grains of corn discharged from the hopper 6 are caught between the lower ends of said valve plates, and the side walls of the chutes 5 adjacent the lower ends of said chutes, and on the succeeding movements of said valve plates the grains of corn discharge from the lower ends of the chutes 5 into the furrows made by the runners 4. Such action prevents the grains of corn from spreading when they are delivered to the furrow.

When my improved corn planter is in operation the hand lever 15 is moved into the position shown in Fig. 4, and while thus positioned the disk 12 is held at its outward limit of movement and the teeth 10$^a$ on the disk 10 are interlocked with the teeth 13 of said disk 12, thus said disk rotates with the disk 10, which latter is carried by the hub 7 of one of the traction wheels 3, and as said disk 12 rotates the cam lugs 14 successively engage with the anti-friction rollers carried by the outer ends of the rods 20, thereby moving the same inward in succession which action swings the lever 21 upon its pivot point and consequently imparts movement to the link 23 and lever 24. The lever 24 upon being actuated imparts lateral sliding movement to the bar 25 and the points of the pawls 37 carried by the ends of said bar 25 engage behind a pair of lugs 33, on the under side of the plates 29, and as said bar 25 moves laterally said plates 29 are correspondingly moved, thus effecting a partial rotation of said plates. When the bar 25 is thus shifted laterally the lugs 38 positioned immediately to the rear of the pawls 37 are drawn into position immediately in front of the pair of lugs to the rear of the pair engaged by the pawls 37 as shown in Fig. 9, and thus the disks 29 are locked against over rotation. When the bar 25 is moved rearward by reason of the cam lug 14 engaging the anti-friction roller of the lowermost one of the pair of rods 20, the pawls 37 are drawn beneath and pass the positions behind the pair of lugs with which the lugs 38 were in engagement, and thus the parts of the dropping mechanism are in position for a succeeding operation. The openings 30 are of such size as to accommodate three or four grains of corn, and as the disks 29 are intermittently rotated in the seed boxes these openings 30 each receive three or four grains of corn, and as the openings are successively brought into alinement with the opening 26 by the intermittent rotation of the disks 29 the corn or seed is discharged. As heretofore described said grains of corn will discharge through the openings 26, and pass through the chutes 27 into the chutes 5. The valve plates 39 are actuated with each lateral shifting movement of the bar 25, and the grains of corn in passing through the chutes 5 will be caught between the lower ends of the plates 39, and the walls of said chutes 5, and temporarily held before discharging from the lower ends of said chutes 5 into the furrows made by the runners 4. Clogging of the grains of corn in the openings 30 is prevented by the spring held fingers 32 which yieldingly scrape or cut off excess grains of corn which may be partially located in the openings 30.

When the planter is being taken to and from work the dropping mechanism is thrown out of operation by moving the hand lever to the position shown in Fig. 5, and when said hand lever is shifted the yoke on the end of the rod 16 engaging in the grooved hub 11 slides said hub and the disk 12 laterally, and thus disengages the teeth 13 from the teeth 10$^a$. When so positioned the disk 10 rotates without effecting rotation of the disk 12 and consequently there is no actuation of the dropping mechanism.

A corn planter of my improved construction is comparatively simple, is positive in action, and the dropping mechanism, which is actuated from one of the traction wheels of the planter can be easily and quickly thrown into or out of operation at the will of the operator.

It will be readily understood that minor changes in the form and construction of the various parts of my improved corn planter can be made and substituted for those herein shown and described without departing from the spirit of my invention.

I claim:

1. The combination with a corn planter provided with the usual traction wheels and seed boxes of perforated plates arranged for rotation in the seed boxes, a transversely disposed bar arranged for reciprocating movement on the frame of the corn planter, the ends of which bar operate beneath the seed boxes, means carried by said bar for engaging the perforated plates, and partially rotating the same, a toothed disk fixed on one of the traction wheels of the planter, a disk arranged to slide on the hub of the wheel adjacent said disk, teeth on the rear side of said sliding disk adapted to engage with the teeth on the fixed disk, a hand lever connected to said sliding disk for moving the same, projections on the front face of the sliding disk, a pair of rods mounted for sliding movement in the frame, which rods at one end are successively engaged by the projections on the sliding disk, a lever fulcrumed to the frame of the planter between said sliding rods, and which lever has pivotal connection with said rods, and connections from said lever to the reciprocating bar.

2. The combination with a corn planter, provided with the usual traction wheels, and seed boxes of perforated plates arranged for rotation in the bottoms of the seed boxes, a bar for simultaneously imparting partial rotary movement to the perforated plate, a toothed disk fixed on one of the traction wheels of the planter, a disk loosely mounted on the hub of the wheel adjacent the fixed disk, teeth on the rear side of the sliding disk adapted to engage the teeth of the fixed disk, means for imparting sliding movement to the loosely mounted disk, lugs on the face of the sliding disk, which lugs are arranged at equal distances apart, a pair of members arranged for sliding movement on the frame of the planter, which members are engaged at one end by the lugs on the disk, and connections from the opposite ends of said members to the perforated plate operating bar.

3. In a corn planter, the combination with seed dropping means, of intermittent operating means therefor, comprising a disk mounted for sliding movement upon the hub of one of the planter wheels, means whereby said disk is locked to the wheel to rotate therewith, a series of lugs formed on the face of said disk, a pair of rods mounted for sliding movement on the frame of the planter, which rods at one end are successively engaged by the lugs on the disk, a lever fulcrumed to the frame of the planter between the sliding rods, and which lever is pivotally connected to the sliding rods at points equidistant from the fulcrum point of said lever, and connections from said lever to the seed dropping means.

In testimony whereof I hereunto affix my signature in the presence of two witnesses, this 16th day of January, 1911.

HENRY G. WOEHLER.

Witnesses:
M. P. SMITH,
CHAS. MADLINGER.